(No Model.) 2 Sheets—Sheet 1.
F. SCHERER.
ELECTRIC TRAP.
No. 424,729. Patented Apr. 1, 1890.
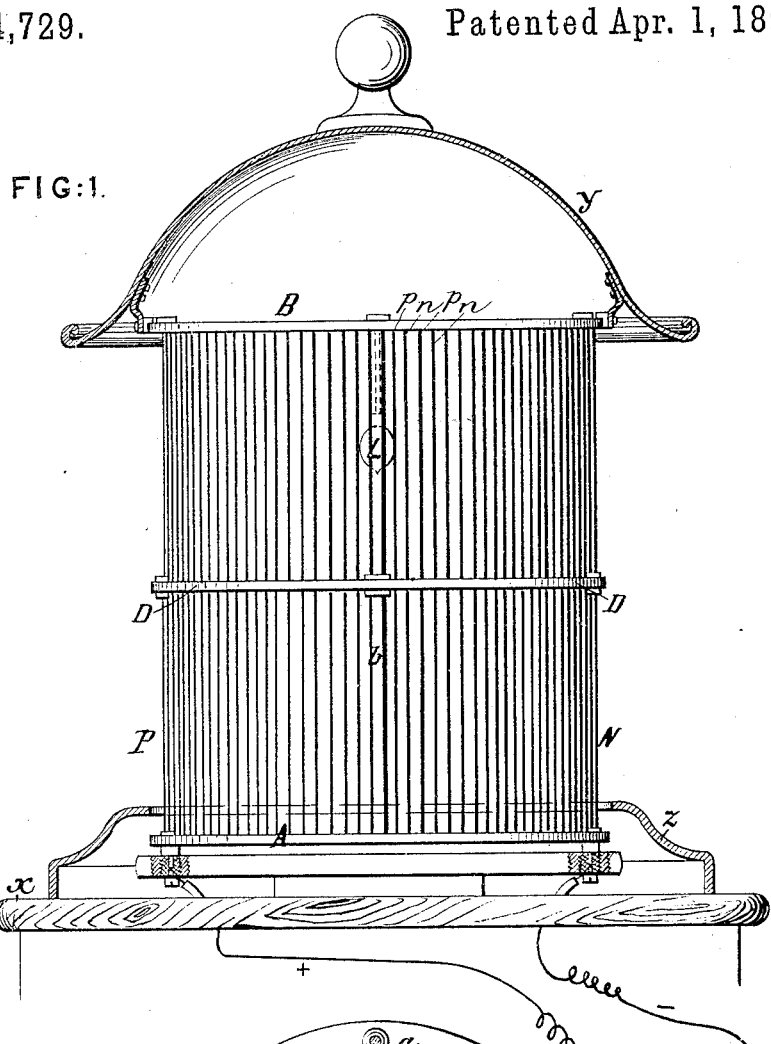
FIG:1.
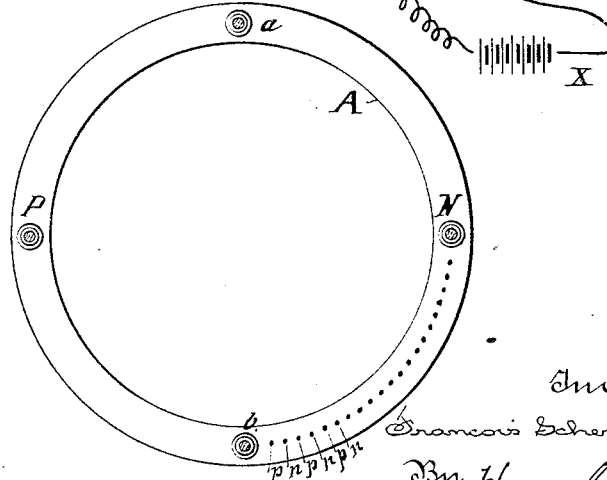
FIG:2.
Witnesses:
John A. Rennie
J. B. Saplinger
Inventor
Francois Scherer,
By Henry Connett
Attorney (No Model.) 2 Sheets—Sheet 2.
F. SCHERER.
ELECTRIC TRAP.
No. 424,729. Patented Apr. 1, 1890.
FIG. 3
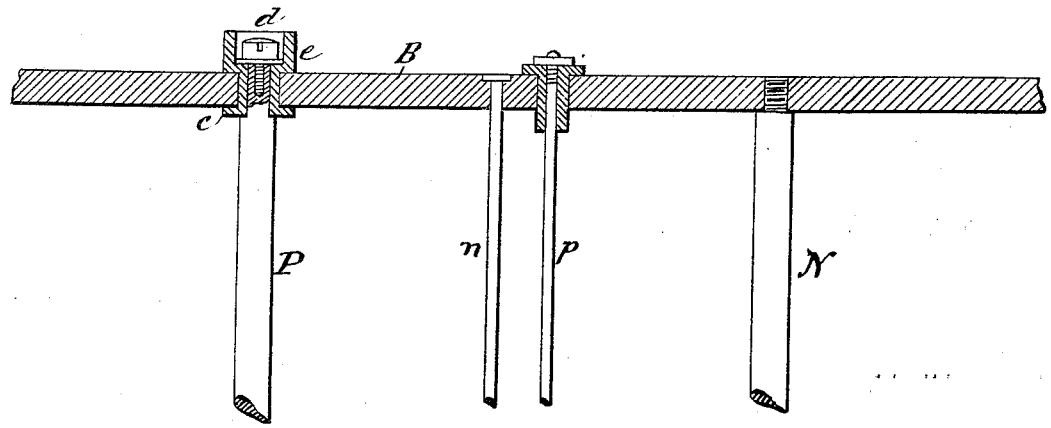
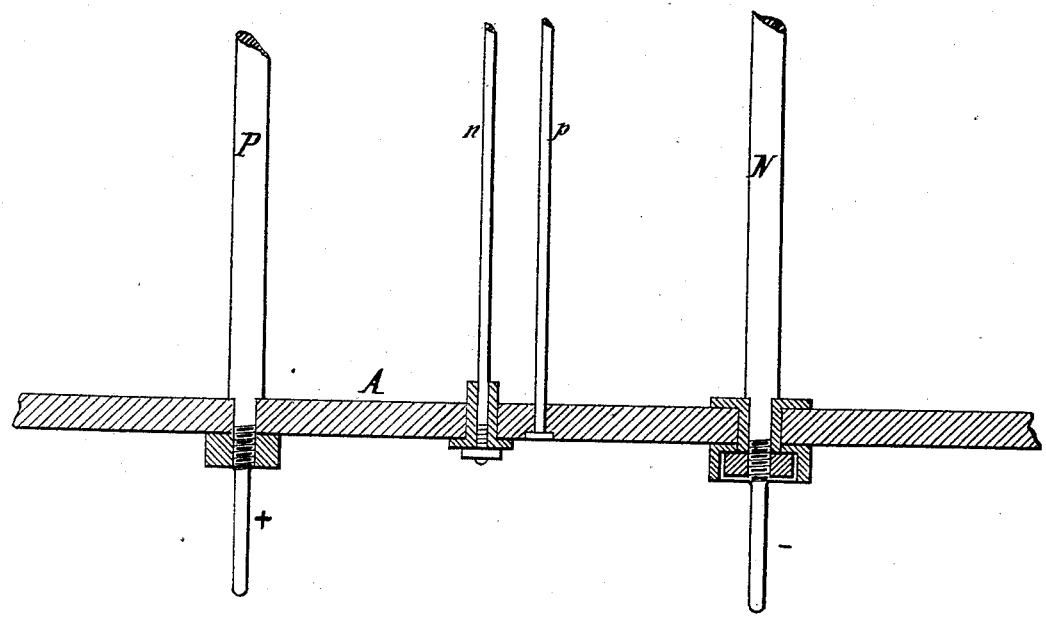
Witnesses:
John A. Rennie
Inventor
François Scherer,
By Henry Connett
Attorney.
N. PETERS, Photo-Lithographer, Washington, D. C.

UNITED STATES PATENT OFFICE.

FRANÇOIS SCHERER, OF PARIS, FRANCE.

ELECTRIC TRAP.

SPECIFICATION forming part of Letters Patent No. 424,729, dated April 1, 1890.

Application filed December 14, 1889. Serial No. 333,798. (No model.)

*To all whom it may concern:*

Be it known that I, FRANÇOIS SCHERER, a citizen of the Republic of Switzerland, residing at Paris, France, have invented certain Improvements in Electric Traps or Lures, of which the following is a specification.

My invention relates to traps for enticing or luring insects and animals and destroying them; and the object of my invention is to produce a trap or device of such a character that the insect or other creature attracted by the light, bait, or other lure, shall be made to close by its body an electric circuit through which will pass a current strong enough to kill or disable the creature.

My invention consists, essentially, of a lure of some kind, as a light, (for nocturnal insects,) bait, &c., to attract the creatures, arranged within or behind an inclosure or screen formed wholly or in part of a species of grid constructed of metallic rods or wires placed side by side, said wires forming parts of an electric circuit. The adjacent wires will, by preference, form the positive and negative terminals of an open electric circuit, and when the body of the insect or other creature comes in contact with the grid in seeking to reach the lure it closes the circuit and the whole current flows through its body, thus killing it instantly.

In the drawings, which serve to illustrate my invention, Figure 1 is a sectional elevation of one embodiment of my invention, the cap and base-piece of the trap only being in section. Fig. 2 is a horizontal section of the same. Fig. 3 is a detail view, on a larger scale than the principal figures, showing certain details of construction.

The trap herein shown is of cylindrical or drum-like form; but this is not essential, nor is it necessary to follow the precise construction to be hereinafter set forth.

A and B are metal rings or disks, which are united by four posts $a$ $b$ and P N. The posts $a$ and $b$ perform only mechanical functions, and if they are made of conducting material they must be insulated from the rings. The manner of securing the metal posts P and N to the rings is illustrated in the detail view, Fig. 3. The post P is connected electrically to the ring A at its lower end and is insulated from the ring B at its upper end by a collar $c$ of ebonite or the like, the attachment being made by means of a screw $d$, the head of which rests in a cup $e$, formed on the insulating-collar. The post N, on the other hand, is connected electrically to the upper ring B, and insulated from the ring A in a manner similar to that described with reference to the post P and ring B.

The wires leading to the positive and negative poles of the generator X are represented, respectively, by the signs $+$ and $-$ in the drawings. Thus the ring A is connected electrically with one pole of the generator, and the ring B with the other pole thereof.

The grid or screen is formed of two series of wires or slender metal rods, the respective wires $p$ and $n$ of which alternate and are electrically connected with the respective rings A and B—that is to say, the wires $p$ are all connected electrically with the ring A at their lower ends and non-electrically with the ring B at their upper ends, and the wires $n$ are connected electrically with the ring B at their upper ends and non-electrically with the ring A at their lower ends. Thus any two adjacent wires $p$ and $n$ become terminals of an open electric circuit.

The stand $x$, cover $y$, and protecting-base $z$ (seen in Fig. 1) are not essential to the working of the apparatus. The intermediate ring D is also non-essential to the operation, and is employed, like the posts $a$ $b$, only to impart strength. This ring D should be made of non-conducting material or be insulated from the wires $p$ $n$ and posts P N.

Within the inclosure formed by the grid is placed the lure L, which for nocturnal insects may be a lamp of any kind, as an incandescent electric lamp, for example. The insects in trying to reach the lamp come in contact with the two adjacent wires $p$ and $n$, close the circuit, and the passage of the current through the body kills instantly.

Of course it is not essential that the wires $p$ and $n$ shall be connected at all with the respective rings B and A; but I prefer to connect them non-electrically therewith, as seen in Fig. 3, in order to stiffen the structure.

The size and general form of the trap, the width of the spaces between the wires or bars $p$ and $n$, and the character of the lure will depend on the kind of creatures it is proposed to attract. In some cases bait may be used. The current employed should be of high tension, and a coil may be employed to intensify it. This, however, as well as the character of the generator to be employed, are matters within the knowledge of those skilled in electrical matters.

The sectional view, Fig. 2, merely shows the ring A in plan and a part of the wires $p$ and $n$ and the posts in section.

By employing the posts P and N as herein shown the connections with the generator are conveniently effected at the bottom of the trap; but the rings or disks A B may be connected with the poles of the generator by any form of conductor.

Having thus described my invention, I claim—

1. An electrical trap consisting of a lure arranged behind a grid composed of metal rods or wires arranged side by side, said rods forming parts of an electric circuit, which includes a generator, and inclosing said lure on all sides, whereby a current of electricity will be caused to pass through the body of any creature brought into contact with adjacent wires of said grid.

2. In an electrical trap, the combination of the rings A and B, the posts P and N, connecting said rings non-electrically, the rods or wires $p$, connected electrically with the ring A, and the rods or wires $n$, connected electrically with the ring B, the wires $p$ alternating with the wires $n$.

In witness whereof I have hereunto signed my name in the presence of two subscribing witnesses.

FRANÇOIS SCHERER.

Witnesses:
EDWARD P. McLEAN.
AUGUSTE MATHIEU.